United States Patent

Carlyon, Jr.

[15] 3,638,860

[45] Feb. 1, 1972

[54] AGRICULTURAL APPARATUS

[72] Inventor: Richard A. Carlyon, Jr., 1000 Sharrow Way, Carson City, Nev. 89701

[22] Filed: May 26, 1970

[21] Appl. No.: 40,610

Related U.S. Application Data

[62] Division of Ser. No. 768,038, Oct. 16, 1968, abandoned.

[52] U.S. Cl. ..........................................239/127
[51] Int. Cl. ...........................................B05b 9/00
[58] Field of Search ..................239/127; 251/305, 145, 146

[56] References Cited

UNITED STATES PATENTS

| | | | |
|---|---|---|---|
| 3,512,713 | 5/1970 | Carlyon | 239/127 |
| 2,722,456 | 11/1955 | Glessner | 239/127 |
| 3,291,443 | 12/1966 | Schulz et al. | 251/305 |
| 3,427,954 | 2/1969 | Long | 251/145 X |
| 2,662,545 | 12/1953 | Kelley | 251/305 X |
| 2,729,238 | 1/1956 | Hite | 251/305 X |

Primary Examiner—Allen N. Knowles
Assistant Examiner—Thomas C. Culp, Jr.
Attorney—Jessup & Beecher

[57] ABSTRACT

Improved agricultural apparatus is provided which, for example, may be mounted on the back of a truck, and which may be used to mulch, fertilize and seed an area conveniently and efficiently. The apparatus to be described includes a tank containing a slurry of the seed, mulch and fertilizer. A circulating pump is coupled to the tank for circulating the slurry through the tank, and a spray-dispensing hose is coupled to the recirculating line for receiving a portion of the circulating slurry to be sprayed thereby over the aforesaid area. The present invention is particularly concerned with an improved valve assembly for use in the apparatus, and which is positioned in a tangential manner with respect to the circulating conduit, so that there is no tendency for the cellulose in the mulch to congregate behind the valve and clog the valve, as is prevalent in the prior art structures.

2 Claims, 2 Drawing Figures

PATENTED FEB 1 1972

3,638,860

INVENTOR.
Richard A. Carlyon, Jr.
Jump and Beecher
By Keith D. Beecher
ATTORNEYS

AGRICULTURAL APPARATUS

This application is a division of copending application Ser. No. 768,038, now abandoned, which was filed Oct. 16, 1968 in the name of the present inventor.

BACKGROUND OF THE INVENTION

As described in the said copending application, agricultural apparatus is known which may be transported to a particular site, and which may be operated at the side to spray a slurry of seed, mulch and fertilizer over the area on which a lawn, or other ground cover is to be cultivated.

The aforesaid apparatus usually includes a tank; and a pump and hose are used in conjunction with the tank, as described above. The tank and other components of the apparatus may be mounted, for example, on the back of a truck so that the apparatus may conveniently be moved from site to site. The tank may then be filled with water at the site; and mulch, seed and fertilizer may be poured into the tank through a convenient chute. The ingredients are mixed with the water in the tank in a slurry either mechanically of manually in the prior art apparatus, and the slurry is then pumped through the aforesaid hose and sprayed over the area to be covered.

In the apparatus described in the copending application, a movable nozzle is provided within the tank itself, and this nozzle is used to circulate the slurry from the pump back into the tank. The movable nozzle maintains the slurry ingredients evenly distributed within the tank.

The present invention is directed to an improved valve assembly for use in the aforesaid apparatus for directing a portion of the circulating slurry from the tank to the spraying nozzle. The improved valve assembly of the invention, as will be described, is constructed to be self-cleaning so that there is no tendency for the slurry ingredients to congregate about the valve intake and clog the valve, even in the presence of slight leakage in the valve.

DETAILED DESCRIPTION OF THE ILLUSTRATED EMBODIMENT

Figure 1:
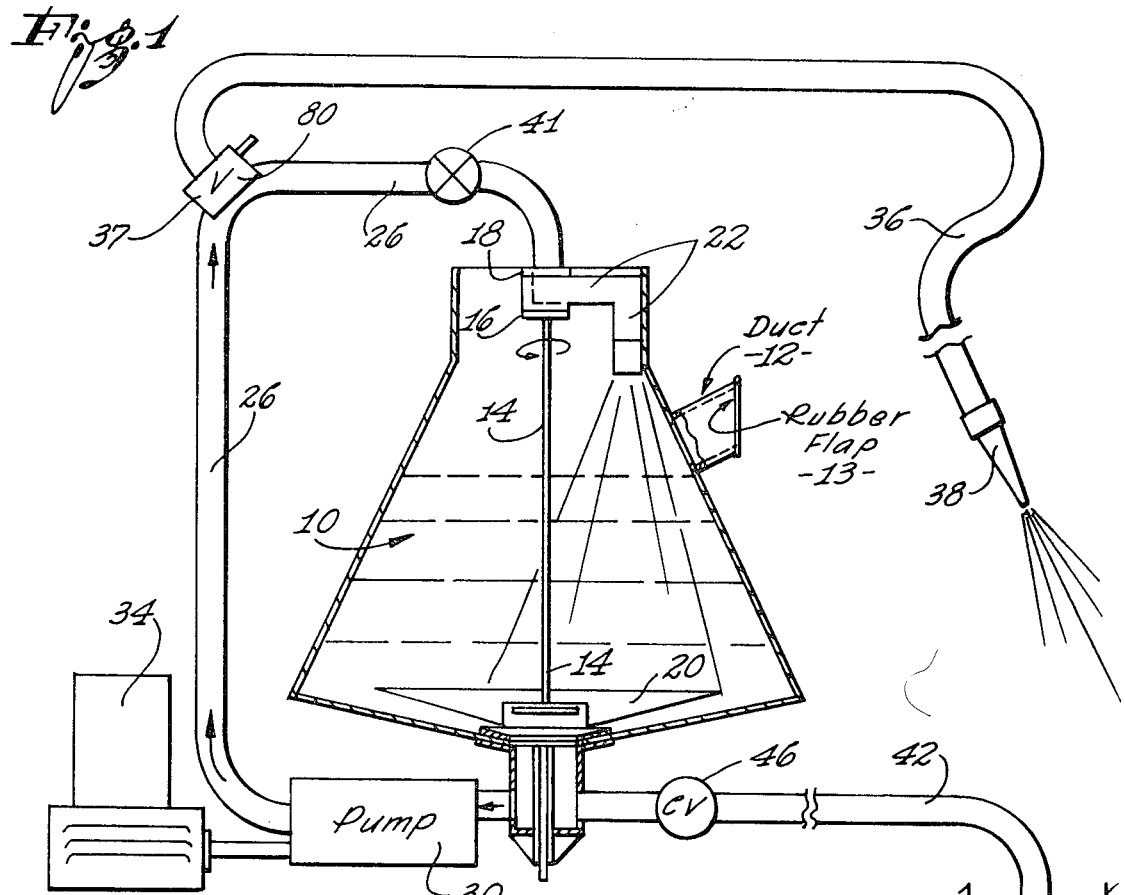
FIG. 1 is a schematic representation of one embodiment of the aforesaid apparatus which incorporates the improved valve assembly of the present invention.

The apparatus illustrated in FIG. 1 includes a tank 10 which may have a generally conical configuration. A duct 12 is formed in one side of the tank 10, and a rubber flap may be provided for the duct 12. The duct 12 permits the seed, fertilizer and mulch to be introduced into the interior of the tank 10 during the operation of the apparatus. In addition, when makeup water is available from a pressurized source, it also may be introduced into the interior of the tank 10 through the duct 12 by means, for example, of a hose.

A central rotatable shaft 14, such as described in the copending application, extends upwardly along the central axis of the tank, and this shaft is rotatably supported within the tank on appropriate bearings 16 and 18. A series of mixer blades 20 may be provided at the lower end of the shaft 14, and these blades rotate with the shaft. The blades 20 serve to mix the ingredients of the slurry and to prevent the ingredients from settling to the bottom of the tank. The blades 20 also serve as a brake for the shaft 14, and prevent excessive rotational speed thereof. It has been found in many applications, however, that the mixer blades 20 are not an essential requirement.

A nozzle 22 is affixed to the shaft 14, and the nozzle 22 extends radially outwardly from the shaft and downwardly towards the bottom of the tank. As pointed out in the copending application, the use of a single nozzle, such as the nozzle 22, permits a relatively large diameter pipeline and nozzle to be used, and thus avoids any tendency for the system to become clogged. The nozzle 22 is tilted slightly with respect to the plane of the drawing, so that when the slurry is forced through it under pressure, the nozzle tends to rotate and turn the shaft 14.

The nozzle 22 is fed by an inlet line 26 which is coupled to the outlet of a pump 30. The intake to the pump 30 is coupled to a valve 32 at the bottom of the tank 10. When the valve 32 is opened, and when the tank 10 contains a quantity of the slurry described above, the operation of the pump 30 causes the slurry to circulate from the bottom of the tank and through the line 26 to the nozzle 22.

The slurry is introduced to the nozzle 22 under pressure, causing the nozzle to spray the slurry back into the tank, and at the same time causes the nozzle 22 to rotate about the axis of the shaft 14, so that the circulated slurry is evenly distributed within the tank. At the same time, the mixer blades 20 rotate to maintain the slurry in a suspended condition, as mentioned above.

A hose 36 is coupled to the line 26 through an appropriate valve, such as, for example, a butterfly valve 37, forming the feature of the present invention. A nozzle 38 is provided at the end of the hose 36. When the valve 37 is closed, the slurry is circulated through the system by the pump 30. When the valve 37 is opened, however, a portion of the circulating slurry bleeds off through the hose 36 and may be sprayed over the area to be cultivated. A valve 41 may be provided in the line 26, as shown, so as to facilitate the fresh water flushing of the hose 36 and nozzle 38, and also to build up a high pressure in the spray nozzle 38, if so desired.

When makeup water is needed, and when no pressurized source is available, the valve 32 may be closed, causing the pump 30 to exert sufficient suction on an additional pipeline 42 to draw water from a reservoir 44 through a check valve 46, and to pump the water into the tank 10 through the pipeline 26 and nozzle 22. However, when the valve 32 is opened during normal operation of the apparatus, the pump 30 does not exert sufficient suction on the line 42 to draw water from the reservoir 40.

Since there is a tendency for the constituents of the slurry to separate, and for the wood cellulose contained in the slurry to pack behind and clog any valve which exhibits even a slight leak, there is a resulting straining action produced by a leaky valve which results in an eventual clog-up behind the valve. This action is prevented in the assembly of the present invention by placing the butterfly valve 37, as best shown in FIG. 2, as close as possible to the actual flow line 26, and in an essentially tangential relationship to the flow of the slurry therein.

Figure 2:
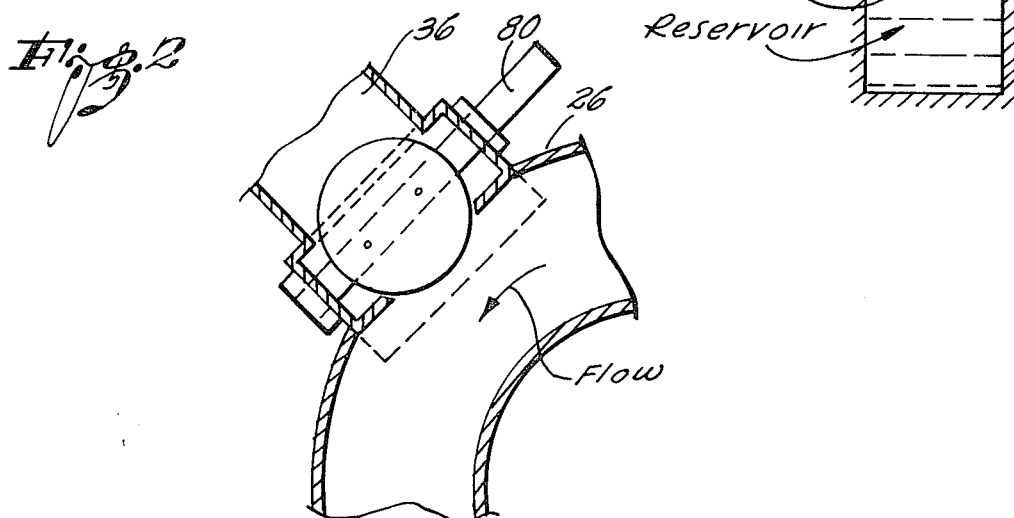
FIG. 2 is an enlarged fragmentary section showing the self-cleaning valve assembly of the invention which is included in the apparatus of FIG. 1.

As shown in FIG. 2, the butterfly valve 37 is mounted on a shaft 80, and it may be turned between an open and a closed position by turning the shaft. When the shaft is closed, leaks in the butterfly valve do not result in a congregation of the slurry ingredients around the valve intake. Instead, the flow of the liquid across the face of the valve maintains a self-cleaning action, so that clogging is prevented.

After a particular job, the remaining slurry in the tank 10, and in the hose 36 and nozzle 38, may be cleaned by closing the valve 41, for example, and by opening the valve 32, so that the pump 30 pumps the contents of the tank 10 through the nozzle 38. Subsequently, the valve 32 may be closed for a fresh water rinse, for example, from the reservoir 44, and by the action described above.

The invention provides, therefore, improved agricultural apparatus which incorporates a valve assembly which is particularly constructed for use in conjunction with the circulating slurry, and which does not have any tendency to become clogged by the ingredients of the slurry, in the event that the valve develops a slight leak.

It will be understood that while a particular embodiment of the invention has been shown and described, modifications may be made, and it is intended in the following claims to cover all modifications which come within the spirit and scope of the invention.

What is claimed is:

1. In apparatus which includes a tank forming a reservoir for a slurry, said tank having an inlet and an outlet, a pump having an intake and an outlet, pipeline means coupling the outlet of said tank to the intake of said pump, and further pipeline means coupling the outlet of said pump to the inlet of said tank, and an outlet hose coupled to said further pipeline means for bleeding a portion of the slurry circulated by said pump through said further pipeline means; the combination of a control valve mounted between said outlet hose and said further pipeline means and mounted on said further pipeline means in a position essentially tangential to the flow of the slurry therethrough, so that the flow of slurry through said further pipeline means sweeps across the face of said control valve to maintain the inlet to said control valve in a clean condition even in the presence of leakage through said control valve.

2. The combination defined in claim 1, in which said control valve comprises a butterfly valve.

* * * * *